March 24, 1959

H. C. REYNOLDS 2,878,700

FASTENER ROTATING AND FEEDING DEVICE

Filed Aug. 9, 1957

2 Sheets-Sheet 1

INVENTOR
HAROLD C. REYNOLDS
BY
HIS ATTORNEY

March 24, 1959  H. C. REYNOLDS  2,878,700
FASTENER ROTATING AND FEEDING DEVICE
Filed Aug. 9, 1957  2 Sheets-Sheet 2

INVENTOR
HAROLD C. REYNOLDS
BY
HIS ATTORNEY

United States Patent Office 2,878,700
Patented Mar. 24, 1959

2,878,700

FASTENER ROTATING AND FEEDING DEVICE

Harold C. Reynolds, Athens, Pa., assignor to Ingersoll-Rand Company, New York, N.Y., a corporation of New Jersey Application August 9, 1957, Serial No. 677,287

3 Claims. (Cl. 81—54)

This invention relates to a machine for tightening an element to a work piece and more particularly to a tightening device having a rotating member through which nuts, bolts and the like are fed, in addition to being tightened by said member.

It is one object of this invention to provide a tightening device including a rotating member through which elements are fed in addition to being tightened thereby.

A further object is to provide means for aligning the element with the work.

Figure 1:
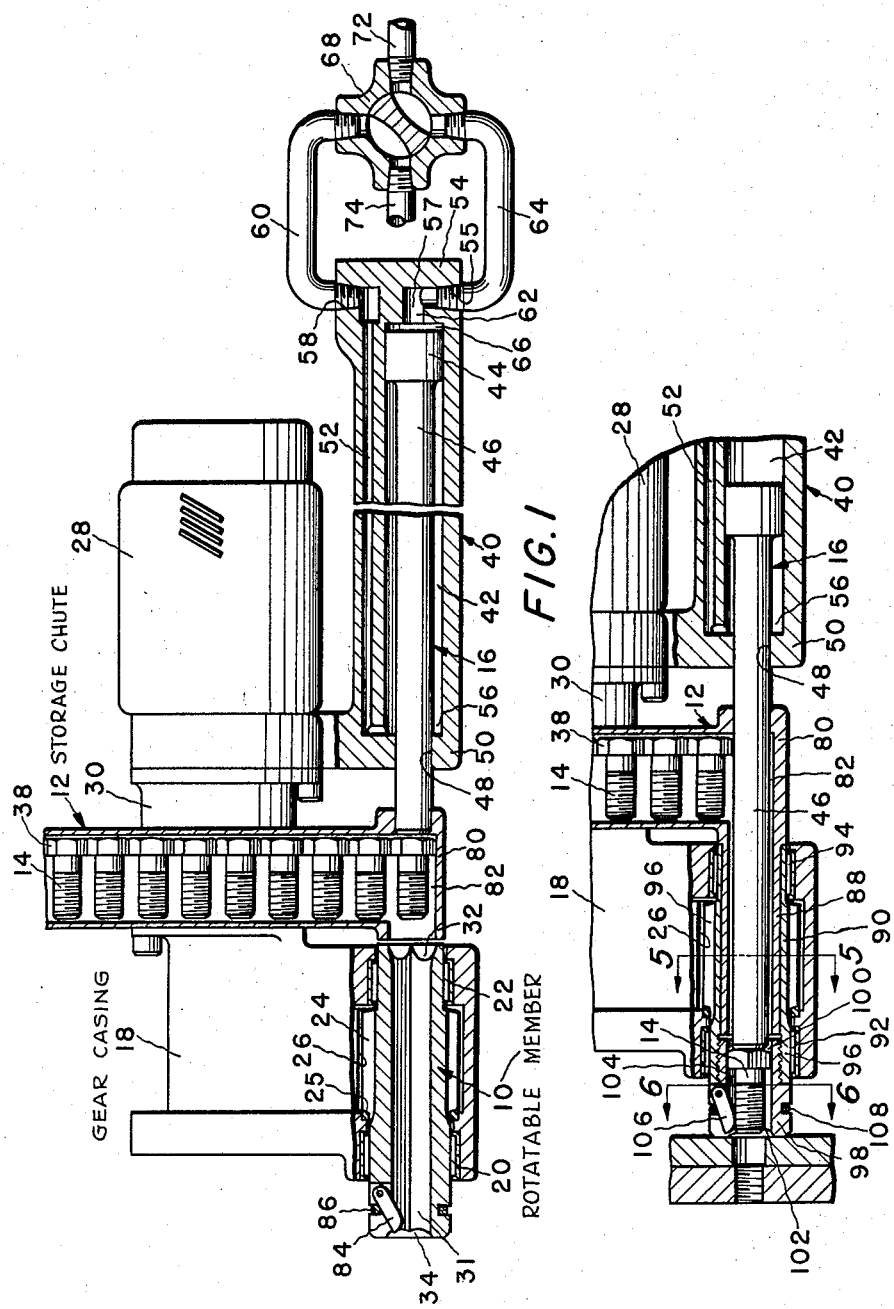
Figure 2:
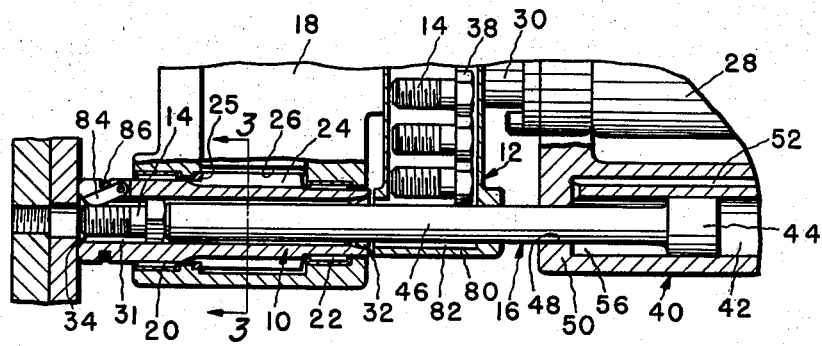
Figure 3:
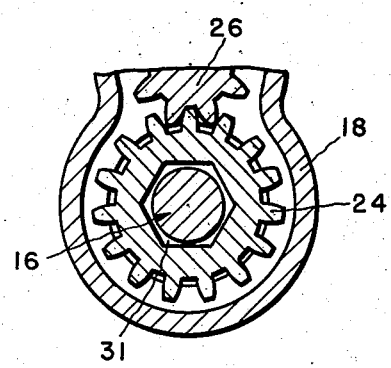
Figure 6:
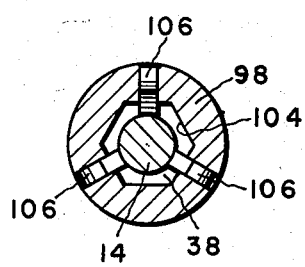
Figure 5:
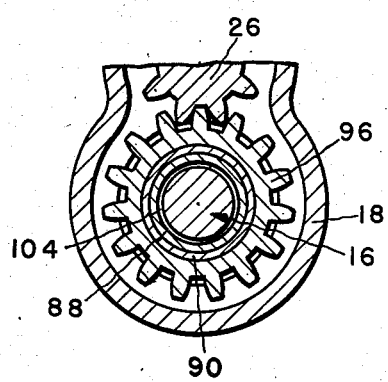

Further objects will become obvious from the following description and drawings in which:

Fig. 1 is a side longitudinal elevation, partly in section, showing the tightening device with a form of the rotating member, Fig. 2 is a side elevation, partly in section, of the lower left end of the tightening device shown in Fig. 1, Fig. 3 is a transverse sectional view of Fig. 2 taken along the line 3—3 looking in the direction of the arrows, Fig. 4 is another form of the rotating member shown in Figs. 1 and 2, Fig. 5 is a transverse sectional view of Fig. 4 taken along the line 5—5 looking in the direction of the arrows, and Fig. 6 is a transverse sectional view of Fig. 4 taken along the line 6—6 looking in the direction of the arrows.

Referring to the drawings and more particularly to Fig. 1, a form of the rotating member 10 is shown by way of illustration in combination with a driving mechanism, a storage chute 12 for elements that are to be attached to the work piece; in this case cap screws 14, and a plunger 16 that feeds the cap screws 14 one by one from the chute 12 through the rotating member 10 into contact with the work. The rotating member 10 then tightens said cap screws 14 into the work piece.

The rotating member 10 is mounted in a gear casing 18 and is supported by bearings 20 and 22 at either end. By way of illustration, the driving mechanism in this instance includes a gear 24 that encircles and drivingly engages the member 10, a gear train 26 (partly shown) also mounted in the casing 18, that meshes with the gear 24, and a motor 28 that drives the gear train 26. Therefore, the motor 28 drives the rotating member 10 through the gear train 26. A wearing ring 25 limits the longitudinal movement of the gear 24. The casing 18 and motor 28 are secured to a connecting member 30 located therebetween.

The rotating member 10 is in the form of a hollow spindle with a longitudinal bore 31, the inlet end 32 of which is in communication with the chute 12 and the outlet end 34 is positioned to feed the cap screw 14 into the work. Means are provided on the outlet end 34 of the bore 31 for releasably engaging an element to rotate it with the member 10. This means is accomplished here by forming at least the outlet end portion 34 of the bore 31 with the same general cross-sectional conformation as that of the element to be tightened, but of slightly greater size. More particularly, in Fig. 1 the bore 31 has shoulders to form a hexagonal shape, as is the cap screw head 38, and is of such a size that it engages the cap screw head 38 as the cap screw 14 is urged into the rotating member 10 thereby causing the cap screw 14 to rotate with the member 10.

A casing 40, which houses the plunger 16 in a longitudinal bore 42 in said casing 40 is supported by the motor 28. The plunger 16 has a head 44 fitted slidably in the bore 42 with a stem 46 extending through a hole 48 in the forward end 50 of casing 40. A longitudinal passageway 52 extends from the rear end 54 of the casing 40 into the forward end 56 of the bore 42, said passageway 52 having an opening 58 located at the rear end 54 for connection with a hose 60. A port 62 located in the casing rear end 54 has one end 55 open for connection with a hose 64 and the other end 57 opening into the rear end 66 of the bore 42.

Hoses 60 and 64 are also connected to a valve 68 which controls the flow of air from a hose 72 to the bore 42, said hose 72 conducting the air from a source (not shown) to the valve 68. The valve 68 in one position permits air to flow to the forward end 56 of the bore 42 while exhausting air from the rear end 66 of the bore 42 through a hose 74 thereby causing the plunger 16 to move in an axial direction away from the rotating member 10. In the other valve position air flows to the bore rear end 66 and exhausts from the bore forward end 56 through the hose 74 thereby causing the plunger 16 to move in an axial direction toward the rotating member 10.

The hollow chute 12 secured to the connecting member 30 acts as a storage bin for the cap screws 14 and readies them for entry into the inlet end 32 of the rotating member bore 31. The inlet end (not shown) of the chute 12 is open for the admission of cap screws 14, said cap screws 14 descending therefrom to the outlet end 80 of the chute 12 by the force of gravity.

A transverse passageway 82 at the chute outlet end 80 is in axial alignment with the bore 32 of the member 10 and is open at one end thereto and open at the other end to the plunger 16. The plunger 16 has a diameter substantially equal to the diameter of said passageway 82 and extends thereinto. When the plunger 16 is urged toward the rotating member 10 it in turn urges the cap screw 14 contained in the passageway 82 therefrom and on through the rotating member 10 into contact with the work. When the valve 68 is reversed the plunger 16 is urged away from the rotating member 10 and the next cap screw 14 then drops into the passageway 82 and is ready to be urged into contact with the work by the plunger 16. Accordingly, the passageway 82 is of such a size it can contain only one cap screw 14 at a time.

Three levers 84 located at the outlet end 34 of the rotating member 10 and pivotally attached thereto center the cap screw 14 in the rotating member 10 assuring its proper alignment with the work, said levers 84 being pressed against the cap screw 14 by a spring 86.

The rotating member 10 shown in Fig. 2 is shown in another form in Fig. 4, this time as a composite element. In this instance, the chute 12 is an L-shaped member having a horizontal tubular extension 88 extending into the gear casing 18.

A rotatable sleeve 90 encircles the tubular extension 88 and is supported at either end by the bearings 92 and 94. The sleeve 90 is rotated in a manner similar to the rotating member 10 before-mentioned, that is a gear 95 encircles and drivingly engages the sleeve 90 by meshing with the gear train 26 (partly shown), thereby causing the sleeve 90 to rotate when the motor 28 drives said gear train 26. One end 96 of the sleeve 90 is threaded for receiving a complementary threaded socket 98 rotated by the sleeve 90.

The socket 98 is hollow with a longitudinal bore 104, the inlet end 100 of which is in communication with the tubular extension 88 and the outlet end 102 is positioned to feed the cap screw 14 into the work. The bore 104 is hexagonal in shape as is the head 38 of the cap screw 14 and is of such size that it engages the cap screw head 38 as the cap screw 14 is urged into the socket 98, thereby causing the cap screw 14 to rotate with the socket 98. Levers 106 of Fig. 6 are attached to the outlet end 102, centering the cap screw 14 in the socket 98 assuring its proper alignment with the work, said levers 106 being pressed against the cap screw by a spring 108.

Reviewing briefly the operational cycle of the machine:

The motor 28 drives the rotating member 10 through the gear train 26 and cap screws 14 are fed one by one into and through the rotating member 10 from the chute 12 by the air plunger 16. The bore 31 of the member 10 engages the cap screw head 38 thereby causing the cap screw 14 to rotate with the member 10 as it is urged into contact with the work. Once in contact the cap screw 14 will be tightened to the work by the rotating member 10.

The form of the invention shown in Fig. 4 operates in substantially the same manner, the difference being the cap screws 14 in this instance are urged by the plunger 16 from the stationary tubular extension 88 of the chute 12 into the rotatable socket 98.

While I have shown and described two specific forms of my invention, it is to be understood that various changes and modifications may be made without departing from the spirit of the invention as set forth in the appended claims.

I claim:

1. A fastener rotating and feeding device for attaching a fastener to a work piece comprising a rotatable member having a longitudinal passageway therethrough with a portion thereof adapted to positively engage said fastener for rotation with said member, a storage chute for fasteners positioned relative to said member to allow only one fastener at a time to enter said member, and urging means adapted to urge one fastener at a time from said chute through said member.

2. The fastener rotating and feeding device claimed in claim 1 in which the storage chute is positioned at substantially right angles with respect to said member and has a longitudinal passage adapted to store a plurality of fasteners and a transverse passage therethrough in axial alignment with the passage of said member and adapted to receive only one fastener at a time from the longitudinal passage, and the urging means is adapted to urge the one fastener from said transverse passage through said member.

3. The fastener rotating and feeding device claimed in claim 2 in which the urging means includes an elongated plunger having a diameter substantially equal to the diameter of the transverse chute passage and is adapted to extend therethrough to urge the one fastener contained in said chute passage into and through said member and to prevent another fastener from entering said chute passage before a predetermined time.

References Cited in the file of this patent

UNITED STATES PATENTS

| | | |
|---|---|---|
| 2,256,012 | Blair | Sept. 16, 1941 |
| 2,373,992 | Billinghurst | Apr. 17, 1945 |
| 2,607,252 | Shaff | Aug. 19, 1952 |
| 2,684,698 | Shaff | July 27, 1954 |
| 2,704,952 | Mooter | Mar. 29, 1955 |
| 2,705,896 | Holmes | Apr. 12, 1955 |

FOREIGN PATENTS

| | | |
|---|---|---|
| 582,409 | France | Oct. 13, 1924 |